US010783251B2

(12) United States Patent
Martinez

(10) Patent No.: US 10,783,251 B2
(45) Date of Patent: Sep. 22, 2020

(54) TAMPER-RESISTANT GEO-FENCE SYSTEM FOR DRONES

(71) Applicant: Intel Corporation, Santa Clara, CA (US)

(72) Inventor: Ernesto Martinez, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 15/855,780

(22) Filed: Dec. 27, 2017

(65) Prior Publication Data
US 2019/0197241 A1 Jun. 27, 2019

(51) Int. Cl.
G06F 21/57 (2013.01)
B64C 39/02 (2006.01)
G08G 5/00 (2006.01)

(52) U.S. Cl.
CPC .......... *G06F 21/572* (2013.01); *B64C 39/024* (2013.01); *G08G 5/003* (2013.01); *G08G 5/006* (2013.01); *G08G 5/0034* (2013.01); *G08G 5/0039* (2013.01); *G08G 5/0069* (2013.01); *B64C 2201/108* (2013.01); *B64C 2201/141* (2013.01)

(58) Field of Classification Search
CPC .... G06F 21/572; G08G 5/0039; G08G 5/006; G08G 5/0034; G08G 5/003; G08G 5/0069; B64C 9/024; B64C 2201/108; B64C 2201/141
See application file for complete search history.

(56) References Cited

U.S. PATENT DOCUMENTS

| 10,427,785 | B2* | 10/2019 | Needham | G06T 7/70 |
| 2016/0114886 | A1* | 4/2016 | Downey | G01C 23/00 701/2 |
| 2017/0192421 | A1* | 7/2017 | Vega | G08G 5/006 |
| 2018/0103036 | A1* | 4/2018 | Fox | H04K 3/45 |
| 2018/0218619 | A1* | 8/2018 | Brown | H04W 12/06 |
| 2018/0281945 | A1* | 10/2018 | Needham | B64C 39/024 |
| 2019/0197241 | A1* | 6/2019 | Martinez | G06F 21/572 |

* cited by examiner

Primary Examiner — Russell Frejd
(74) Attorney, Agent, or Firm — Schwegman Lundberg & Woessner, P.A.

(57) ABSTRACT

Various systems and methods for operating a drone are described herein. A system for operating a drone includes a trusted execution environment (TEE) circuit to: store a firmware of the drone; and determine whether the firmware is valid; and a processor subsystem to: access a flight plan authorization when the firmware is determined to be valid; and navigate the drone according to the flight path authorization.

25 Claims, 6 Drawing Sheets

TAMPER-RESISTANT GEO-FENCE SYSTEM FOR DRONES

TECHNICAL FIELD

Embodiments described herein generally relate to drones and related hardware interfaces and in particular, to a tamper-resistant geo-fence system for drones.

BACKGROUND

An unmanned aerial vehicle (UAV), commonly known as a drone, is an aircraft without a human pilot aboard. The size of drones may range from small hobby scale size suitable for close range operation near a user to large scale systems capable of hauling payloads over many miles. Drones may be used to provide services, perform military operations to reduce risk to human pilots, as entertainment, or the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Personal-use drones are becoming more popular. Recently, the Federal Aviation Association (FAA) has reported receiving 2000 new drone registrations each month. As the number of drones increase, the risk of encounters with airplanes is becoming a real problem. In the first three quarters of 2017 over 700 encounters are documented in the FAA database. Most of them at relative low altitudes under 3000 feet.

In response of this situation the FAA is imposing stronger restrictions on where drones are allowed to fly. Some of this restrictions are making the commercial use of drones almost impossible. For example, drone pilots must keep line of sight with the drone at all times, notify airport operators, or request authorization from the FAA for each flight. Permission to fly into congested airspace can take up to 90 days.

Information about airspace and related regulations is available, but is very dynamic. For example, one morning a drone may operate without restriction in a remote area and in the afternoon be prohibited due a Temporary Flight Restriction (TFR) due to a wild fire. Authorization granted to operate on one day may be invalid the next day. What is needed is an accurate, streamlined, secure, and easy-to-access mechanism for drone operators to request and receive authorization to operate a drone.

The systems and methods described here integrate and update airspace information in a secure way with a drone's firmware. The drone's firmware may be secured from tampering. The firmware may be stored in an anti-tampering container, such as a trusted execution environment (TEE). Additionally, the drone firmware may be signed by an authority. An operational geo-fence may be provided to a drone. The geo-fence may be one that establishes a restricted zone where the drone is not allowed to enter, or may be one that establishes a permissive zone where the drone is allowed to operate, but not allowed to exit. In the case where the drone is excluded from some airspace, the drone or the drone operator may request clearance from a regulating authority. The drone may be provided authentication to operate in a restricted geo-fence. The authentication may be provided with a unique code, which is stored in a secure container in the drone's firmware, and provides the drone authentication to operate in a restricted geo-fence. While the drone is operating in the restricted geo-fence, other aircraft may be prohibited from operating in the same airspace. Other embodiments are described in the following discussion.

Figure 1:
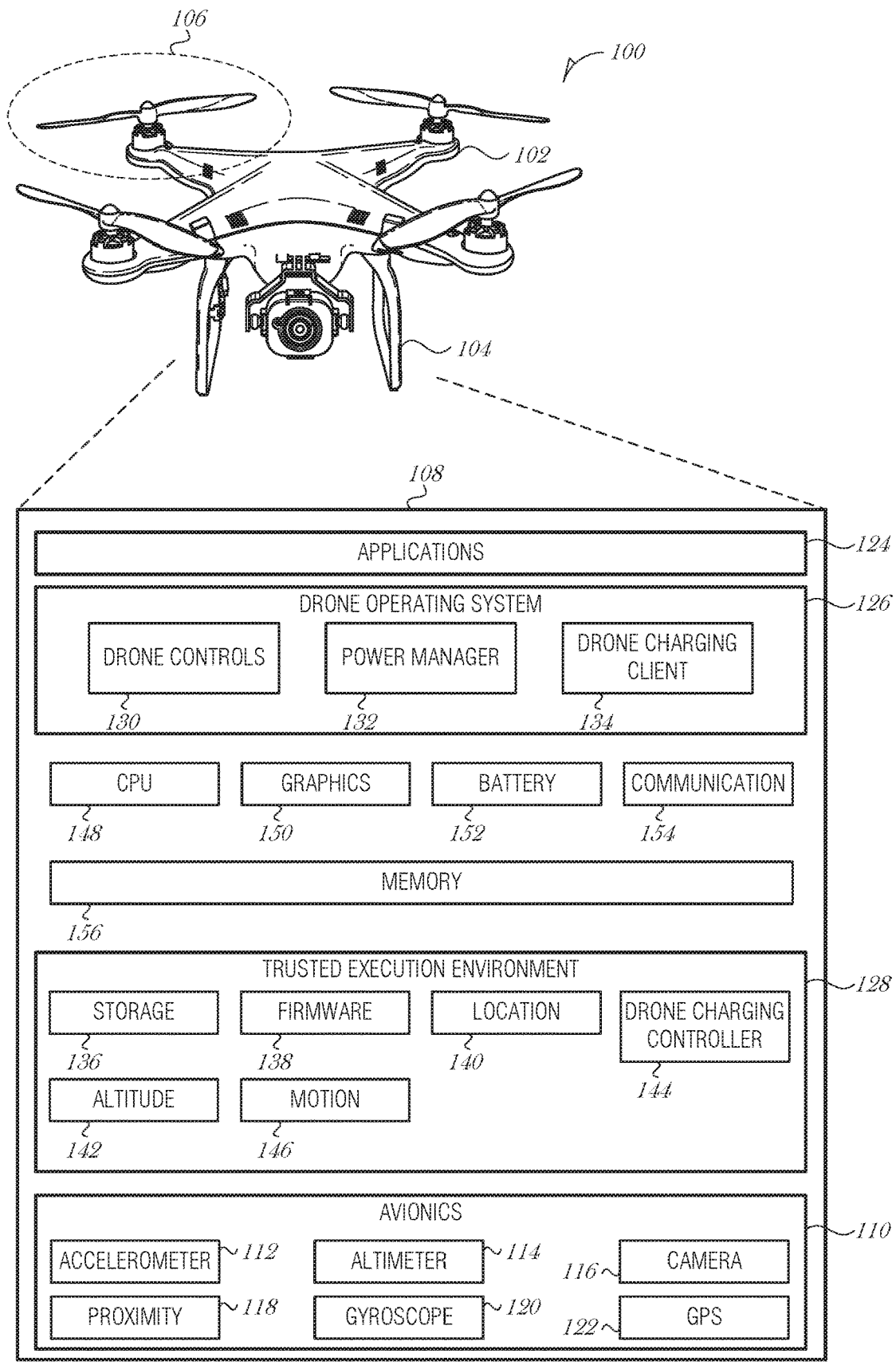
FIG. 1 is a block diagram illustrating a drone, according to an embodiment.

FIG. 1 is a block diagram illustrating a drone 100, according to an embodiment. The drone 100 may include an airframe 102, a landing mechanism 104, a flight mechanism 106, and a control environment 108. The airframe 102 may be made of polymers, metals, etc. Other components of the drone 100 may be secured to the airframe 102.

The flight mechanism 106 may include mechanisms that propel the drone 100 through the air. For example, the flight mechanism 106 may include propellers, rotors, turbofans, turboprops, etc. The flight mechanism 106 may operably interface with avionics 110. The avionics 110 may be part of the control environment 108 (as shown in FIG. 1) or as standalone components. The avionics 110 may include an accelerometer 112, an altimeter 114, a camera 116, proximity sensors 118, gyroscopes 120, and a global positioning system (GPS) receiver 122.

The various components of the avionics 110 may be standalone components or may be part of an autopilot system or other avionics package. For example, the altimeter 114 and GPS receiver 122 may be part of an autopilot system that include one or more axes of control. For instance, the autopilot system may be a two-axis autopilot that may maintain a preset course and hold a preset altitude. The avionics 110 may be used to control in-flight orientation of the drone 100. For example, the avionics 110 may be used to control orientation of the drone 100 about pitch, bank, and yaw axes while in flight.

In many cases, the drone 100 operates autonomously within the parameters of some general protocol. For example, the drone 100 may be directed to deliver a package to a certain residential address or to a particular geo-coordinate. The drone 100 may act to achieve this directive avoiding collisions and other obstacles it may encounter along the way.

In other cases where the drone 100 does not operate in fully autonomous mode, the camera 116 may allow an operator to pilot the drone 100. Non-autonomous, or manual flight, may be performed for a portion of the drone's operational duty cycle, while the rest of the duty cycle may be performed autonomously.

The computing environment 108 may also include applications 124, a drone operating system (OS) 126, and a trusted execution environment (TEE) 128. The applications 124 may include services to be provided by the drone 100. For example, the applications 124 may include a surveillance program that may utilize the camera 116 to perform aerial surveillance. The applications 124 may include a communications program that allows the drone 100 to act as a cellular repeater or a mobile Wi-Fi hotspot. Other applications may be used to operate or add additional functionality to the drone 100. Applications may allow the drone 100 to monitor highway vehicle traffic, survey disaster areas, deliver packages, perform land surveys, perform light shows, or other activities including those described elsewhere in this document.

The drone OS 126 may include drone controls 130, a power management program 132, and a drone charging client 134. The drone controls 130 may interface with the avionics 110 to control flight of the drone 100. The drone controls 130 may optionally be a component of the avionics 110, or be located partly in the avionics 110 and partly in the drone OS 126. The power management program 132 may be used to manage power usage. In addition, the power management program 132 may be used to determine a power consumption of the drone 100 during a flight. For example, the drone 100 may need a certain amount of energy to fly to a destination and return to base. Thus, in order to complete a roundtrip mission, the drone 100 may need a certain battery capacity. As a result, the power management program 132 may cause the drone 100 to terminate a mission and return to base when battery power is insufficient to complete the mission.

The drone charging client 134 may control the battery recharge cycles. For example, the drone charging client 134 may include data regarding various charging protocols, such as a wireless charging mechanism.

The TEE 128 may provide secured storage 136, firmware, drivers and kernel 138, a location processing controller 140, an altitude management controller 142, a drone charging controller 144, and a motion processing controller 146. The components of the TEE 128 may operate in conjunction with other components of the drone 100. For example, the drone charging controller 144 may operate with the drone charging client 134 during recharging. The altitude management controller 142 may operate with the avionics 110 during flight.

The TEE 128 may provide a secure area for storage of components used to authenticate communications between drones, between a drone and a base station, or between a drone and an air traffic controller. For example, the TEE 128 may store SSL certificates or other security tokens. The data stored in the TEE 128 may be read-only data such that during operation the data cannot be corrupted or otherwise altered by malware or viruses.

The computing environment 108 may include a central processing unit (CPU) 148, a video/graphics card 150, a battery 152, a communications interface 154, and a memory 156. The CPU 148 may be used to execute operations, such as those described herein. The video/graphics card 150 may be used to process images or video captured by the camera 116. The memory 156 may store data received by the drone 100 as well as programs and other software utilized by the drone 100. For example, the memory 156 may store instructions that, when executed by the CPU 148, cause the CPU 148 to perform operations such as those described herein.

The battery 152 may provide power to the drone 100. While FIG. 1 shows a single battery, more than one battery may be utilized with the drone 100. While FIG. 1 shows various components of the drone 100, not all components shown in FIG. 1 are required. More or fewer components may be used on a drone 100 according to the design and use requirements of the drone 100.

Figure 2:
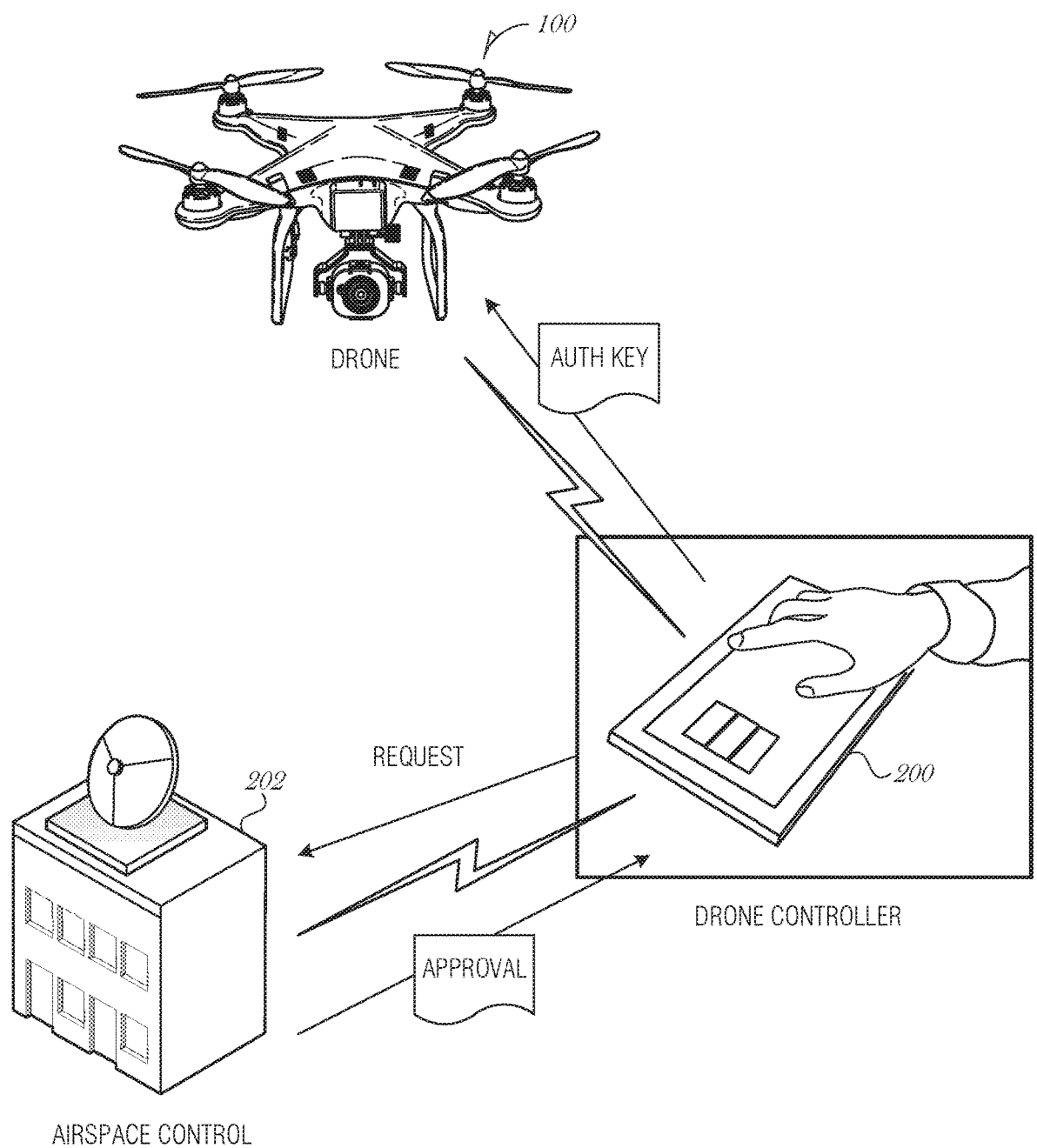
FIG. 2 is a diagram illustrating an operating environment, according to an embodiment.

FIG. 2 is a diagram illustrating an operating environment, according to an embodiment. A drone 100 is controlled by a drone controller 200. The drone controller 200 may be any type of electronic device capable of controlling the drone 100. For instance, the drone controller 200 may be a laptop computer, a tablet, a mobile phone, or the like, that is specially programmed (e.g., with a drone control application), to control the drone's actions. The drone controller 200 may also be a radio control (RC) transmitter with operating in an open band, such as the 900 MHz or 2.5 GHz bands. The RC transmitter may include one or more self-centering spring-loaded sticks to control the pitch, yaw, and roll of the drone 100. The RC transmitter may also be used to control the throttle, ailerons, rotor angles, or other mechanisms of the drone 100 to cause the drone 100 to move in a certain direction, lift or descend, or aerial other movements.

While some drones 100 are only capable of low-level flight for short periods, such as under 100 feet with a 15 minute battery life, other drones 100 are capable of much higher and much longer duty cycles. For the more capable drones 100, there is a cause for concern that such drones may interfere with regular private or commercial air traffic. Air traffic is typically controlled by a local or remote airspace control 202. The airspace control 202 may be a regional airport. The airspace control 202 may define areas of limited or restricted flight. Drones and other aircraft are not allowed in these areas unless they have the required clearance. The restricted areas may be long-standing areas, such as an area around an airport or an area around a military base. Other restricted areas may be temporary, and created for a period of time when air traffic is prohibited. For instance, a temporary flight restriction (TFR) may be created over a wildfire area. The airspace control 202 is able to catalog and maintain records of the restricted areas, requests for access to operate in restricted areas, and issue permits to operate in restricted areas. The airspace control 202 may operate in conjunction with a local or federal agency, such as the FAA.

Flight-restricted areas may be created using geo-fences. A geo-fence is a virtual perimeter around a real-world area. A geo-fence may be defined using a point-and-radius definition, a two-point definition (e.g., defining the northwest and southeast points of a rectangular area), a three-point definition (e.g., defining the northeast, southwest, and altitude of a regular volume), or the like. Geo-fences may be dynamic or static. Dynamic geo-fences may have an expiration, limited times of enforce or being active, or the like. Static geo-fences, once defined, may exist for an indeterminate amount of time. Geo-fences may be named, have owners, have priorities, be selectively restricting (e.g., military may enter, but civilian aircraft may not), or have other attributes. Geo-fences may be defined using a standard data structure so that an operator or machine may decode the geo-fence data structure and obtain the relevant information. Geo-fences may be signed or otherwise authenticated by the issuer or creator of the geo-fence. The signature may be created using a public key certificate, which was signed by a certificate authority.

When an operator wants to operate the drone 100 in restricted airspace, the operator may request clearance from the airspace controller 202. The request may include the type of aircraft, the origin (e.g., departure location), the destination (e.g., arrival location), the estimated departure time, the estimated in-flight time, the flight route (e.g., defined using waypoints), the cruising altitude, the model of aircraft, the tail number or other identifier on the aircraft, and the like. The airspace controller 202 may issue an approval. The approval may be for a specific time period when the drone 100 is allowed to operate in the controlled airspace, a geographic area where the drone 100 is allowed to operate, and other details. The approval may include the parameters of an approved time period (e.g., begin and end time of approval), an approved ceiling (maximum altitude), an approved departure location, and an approved arrival location. The approved departure location and approved arrival location may be an airport, a latitude-longitude, or other geographical location.

The approval may be referred to as an authorization key. The authorization key may be loaded into the drone's firmware (e.g., firmware 138). Once the authorization key is loaded, the drone 100 is able to operate in the restricted airspace according to the parameters of the approval. Absent the authorization key, the drone 100 may autonomously act to avoid entering restricted airspace. For instance, if the operator attempts to manually pilot the drone 100 into restricted airspace around an airport, the drone 100 may autonomously halt in flight and the operator may be provided with an informational error.

Figure 3:
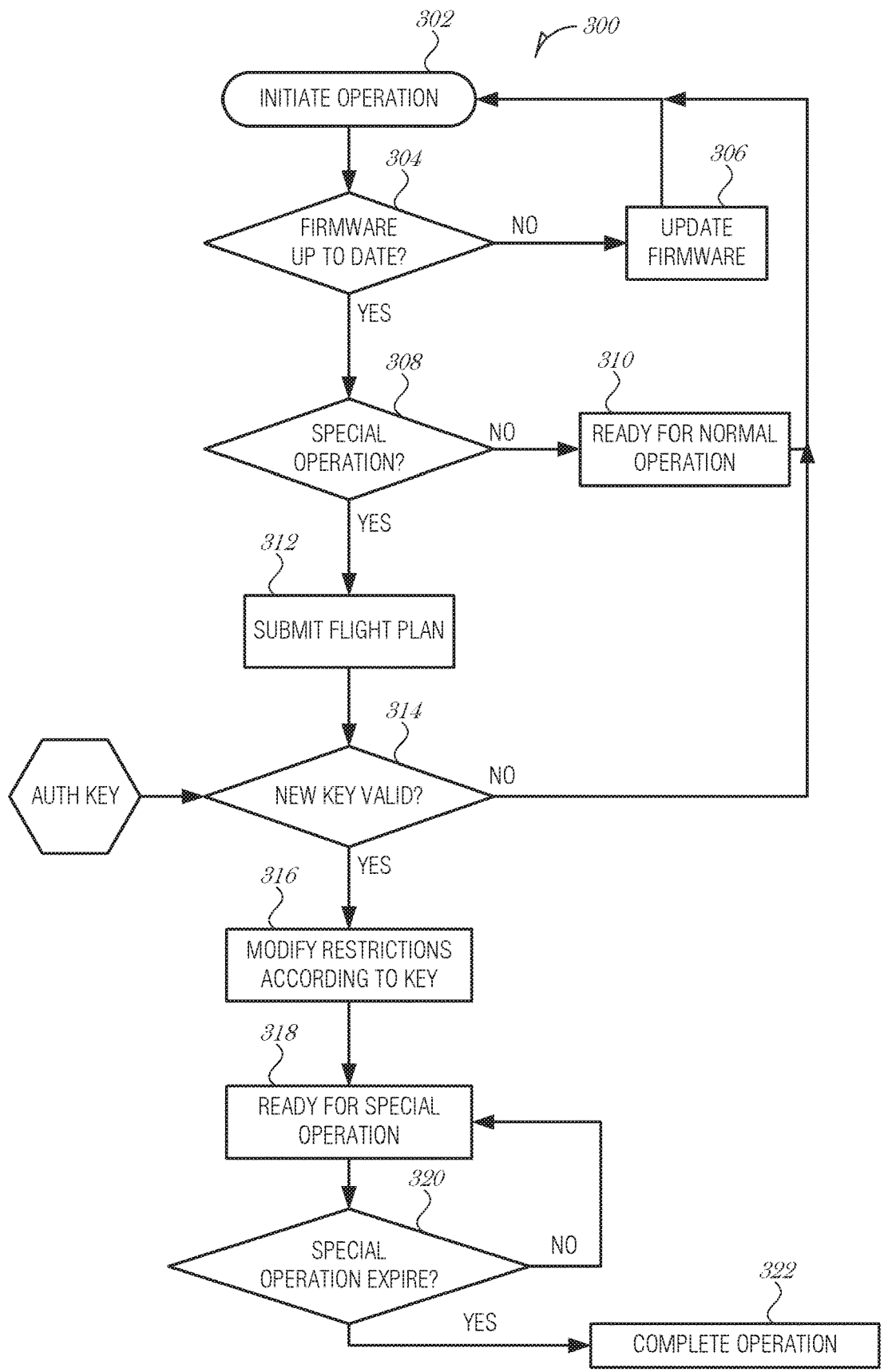
FIG. 3 is a flowchart illustrating a method 300 for operating a drone, according to an embodiment.

FIG. 3 is a flowchart illustrating a method 300 for operating a drone, according to an embodiment. At 302, an operator initiates operation of a drone. A check is made of whether the drone's firmware is up to date (decision operation 304). The drone firmware may need to be signed or authorized by an airspace control agency, such as a governmental agency. If it is not up to date, then the firmware is updated (operation 306). The firmware check ensures that the drone is operating with authorized hardware, firmware, and software. Drones may be regulated as much as regular aircraft, such that to operate a drone in restricted airspace, the drone will be required to operate using certain approved firmware. Firmware is signed by an authority. The firmware may be signed by a government authority, such as the FAA. If the drone receives or loads unsigned firmware, then the drone may disable itself. In other words, the drone hardware may be designed to run only signed firmware, and only operate when signed firmware is loaded. The firmware may be loaded into a trusted execution environment (TEE) of the drone to ensure that the firmware is secured from tampering.

The firmware may include operational programming, operational parameters, an airspace database, or other configuration or operational components. The airspace database may include boundaries of controlled airspace, such as airports, military installations, or the like. The airspace database may include one or more sector maps. The airspace database may be updated on a periodic or regular basis, such as every two weeks, to ensure that changes to airspace restrictions are known to the drone or the drone operator.

The firmware may be updated over the air (e.g., using a wireless network), or by using a physical network connection (e.g., using a universal serial bus (USB) device). The firmware may be updated on demand (e.g., when the drone or drone operator requests a flight plan approval) or may be pushed to the drone (e.g., on an subscription basis or other regular schedule to update the drone firmware). The update schedule may be configured by the drone operator.

If the firmware is up to date, then it is determined whether a special operation is being planned (decision operation 308). A special operation is one that requires airspace clearance. A normal operation is one that does not require airspace clearance—e.g., operation where there are no restrictions. For instance, flying below 500 feet and not near any airports would likely be considered normal operation, whereas flying above 500 feet or flying near a military base, for example, would likely be considered special operation.

If the drone is not going to be performing a special operation, then the drone may be operated in normal operation mode (operation 310). If instead, the drone is to operate in special operation mode, then a flight plan is submitted to an airspace control agency (operation 312), and the authorization key is received and validated (operation 314). The flight plan may be submitted by the operator over the phone or in person, for example. The flight plan may also be submitted electronically, for example with use of a compute device. The compute device may be a drone controller, laptop, desktop, mobile phone, or the like. The flight plan may be submitted using an application (e.g., an app), a webpage, or other program.

The authorization key may be signed by the airspace control agency. For instance, the authorization key may be signed by a governmental agency (e.g., the FAA) with a public key certificate. The authorization key includes the parameters that define permissions for the drone to operate in a restricted airspace.

Once the authorization key is validated, for example by contacting a certificate authority or other signing authority, the airspace clearance is loaded into the drone and flight restrictions are modified (operation 316). The drone may then initiate the special operation mode and fly according to the flight plan (operation 318).

The drone checks to ensure that it operates within the allotted time frame of the approved flight plan. If the special operation mode is about to expire (decision operation 320), the drone may complete its operation (operation 322). For instance, the drone may navigate to its destination. The destination may be the destination location provided in the flight plan. Alternatively, the drone may operate from a base, and navigate back to the base before the special operation time slot is expired.

Figure 4:
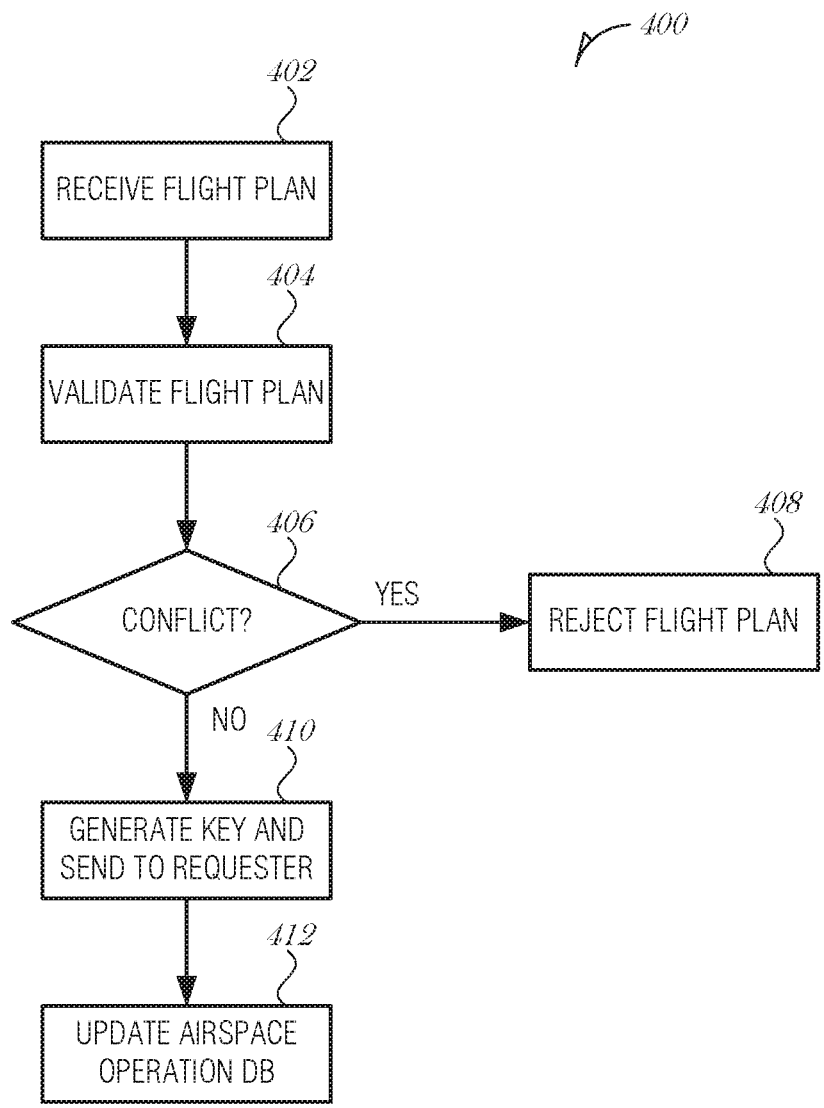
FIG. 4 is a flowchart illustrating a method for clearing a drone for operation in a restricted area, according to an embodiment.

FIG. 4 is a flowchart illustrating a method 400 for clearing a drone for operation in a restricted area, according to an embodiment. At 402, a new flight plan is received at an airspace controller. The airspace controller may be an airport, a centralized airspace control agency, or other entity that controls airspace. Based on drone registration details, flight plan details, and other information, the airspace controller validates the flight plan (operation 404). If the flight plan conflicts with other flight operations (decision operation 406), then the flight plan is rejected and a reason may be sent to the drone operator indicating why the flight plan was rejected (operation 408). If instead, the flight plan is approved, then an authorization key is generated and sent to the drone operator (operation 410). The airspace controller then updates the airspace operation database (operation 412) so that other requests are aware of the drone's flight plan.

Figure 5:
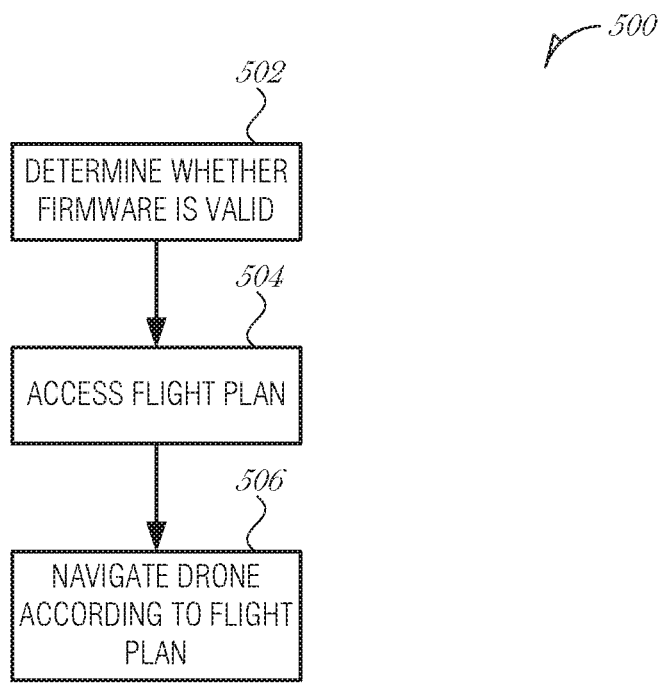
FIG. 5 is a flowchart illustrating a method for operating a drone, according to an embodiment.

FIG. 5 is a flowchart illustrating a method 500 for operating a drone, according to an embodiment. At 502, it is determined whether a firmware of the drone is valid. In an embodiment, determining whether the firmware of the drone is valid includes checking whether the firmware is of a latest version of the firmware. In an embodiment, determining whether the firmware of the drone is valid includes checking whether the firmware is a signed copy of the firmware.

At 504, a flight plan authorization is accessed when the firmware is determined to be valid. In an embodiment, the flight plan authorization includes a start time, an end time, a ceiling, a departure location, and an arrival location.

In an embodiment, the flight plan authorization is provided by an airspace authority. In a further embodiment, the flight plan authorization is digitally signed by the airspace authority. The airspace authority may be a governmental authority, such as the FAA.

At 506, the drone is navigated according to the flight path authorization. In an embodiment, navigating the drone according to the flight plan authorization includes checking whether the drone's operation is approaching the end time and navigating the drone to an unrestricted area before the end time. In a further embodiment, the unrestricted area comprises the arrival location.

In an embodiment, navigating the drone according to the flight plan authorization includes receiving flight control input from a human operator of the drone, determining that the flight control input navigates the drone out of an area authorized by the flight plan authorization, and autonomously navigating the drone to maintain operation in the area authorized by the flight plan authorization.

In an embodiment, the method 500 includes obtaining an updated firmware when the firmware is determined to not be valid and installing the updated firmware in the drone.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
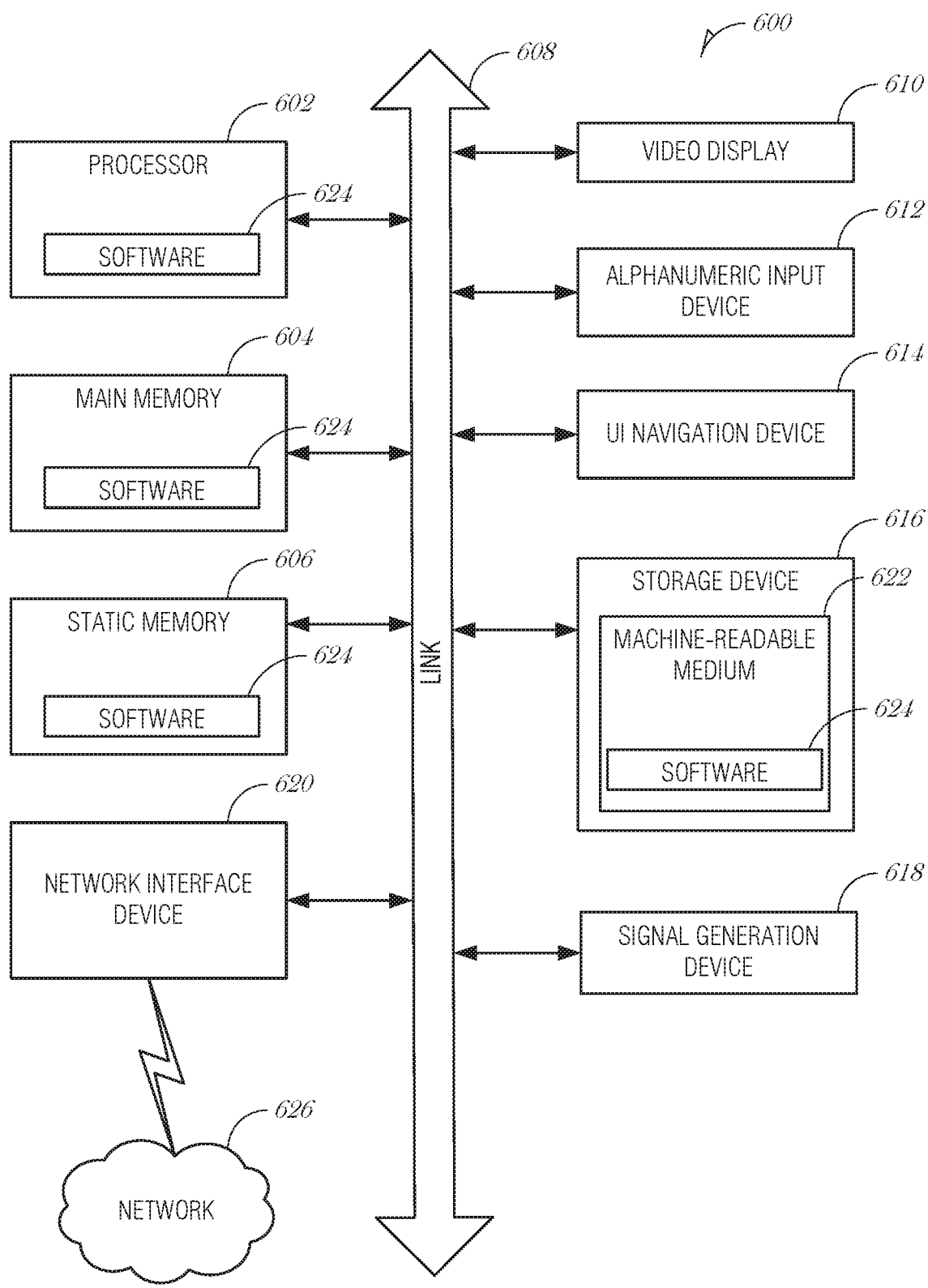
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a drone, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may optionally further include a video display unit 610, an alphanumeric input device 612 (e.g., a keyboard), and a user interface (UI) navigation device 614 (e.g., a mouse). In an embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, camera, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a system for operating a drone, the system comprising: a trusted execution environment (TEE) circuit to: store a firmware of the drone; and determine whether the firmware is valid; and a processor subsystem to: access a flight plan authorization when the firmware is determined to be valid; and navigate the drone according to the flight path authorization.

In Example 2, the subject matter of Example 1 includes, wherein to determine whether the firmware of the drone is valid, the TEE circuit is to check whether the firmware is of a latest version of the firmware.

In Example 3, the subject matter of Examples 1-2 includes, wherein to determine whether the firmware of the drone is valid, the TEE circuit is to check whether the firmware is a signed copy of the firmware.

In Example 4, the subject matter of Example 3 includes, wherein the firmware is signed by an airspace control agency.

In Example 5, the subject matter of Examples 1-4 includes, wherein the firmware includes an airspace database.

In Example 6, the subject matter of Examples 1-5 includes, wherein the flight plan authorization comprises a start time, an end time, a ceiling, a departure location, and an arrival location.

In Example 7, the subject matter of Examples 1-6 includes, wherein the flight plan authorization is provided by an airspace authority.

In Example 8, the subject matter of Example 7 includes, wherein the flight plan authorization is digitally signed by the airspace authority.

In Example 9, the subject matter of Examples 1-8 includes, wherein to navigate the drone according to the flight plan authorization, the processor subsystem is to: check whether the drone's operation is approaching the end time; and navigate the drone to an unrestricted area before the end time.

In Example 10, the subject matter of Example 9 includes, wherein the unrestricted area comprises the arrival location.

In Example 11, the subject matter of Examples 1-10 includes, wherein to navigate the drone according to the flight plan authorization, the processor subsystem is to: receive flight control input from a human operator of the drone; determine that the flight control input navigates the drone out of an area authorized by the flight plan authorization; and autonomously navigate the drone to maintain operation in the area authorized by the flight plan authorization.

In Example 12, the subject matter of Examples 1-11 includes, wherein the TEE circuit is to: obtain an updated firmware when the firmware is determined to not be valid; and install the updated firmware in the drone.

Example 13 is a method of operating a drone, the method comprising: determining whether a firmware of the drone is valid; accessing a flight plan authorization when the firmware is determined to be valid; and navigating the drone according to the flight path authorization.

In Example 14, the subject matter of Example 13 includes, wherein determining whether the firmware of the drone is valid comprises checking whether the firmware is of a latest version of the firmware.

In Example 15, the subject matter of Examples 13-14 includes, wherein determining whether the firmware of the drone is valid comprises checking whether the firmware is a signed copy of the firmware.

In Example 16, the subject matter of Example 15 includes, wherein the firmware is signed by an airspace control agency.

In Example 17, the subject matter of Examples 13-16 includes, wherein the firmware includes an airspace database.

In Example 18, the subject matter of Examples 13-17 includes, wherein the flight plan authorization comprises a start time, an end time, a ceiling, a departure location, and an arrival location.

In Example 19, the subject matter of Examples 13-18 includes, wherein the flight plan authorization is provided by an airspace authority.

In Example 20, the subject matter of Example 19 includes, wherein the flight plan authorization is digitally signed by the airspace authority.

In Example 21, the subject matter of Examples 13-20 includes, wherein navigating the drone according to the flight plan authorization comprises: checking whether the drone's operation is approaching the end time; and navigating the drone to an unrestricted area before the end time.

In Example 22, the subject matter of Example 21 includes, wherein the unrestricted area comprises the arrival location.

In Example 23, the subject matter of Examples 13-22 includes, wherein navigating the drone according to the flight plan authorization comprises: receiving flight control input from a human operator of the drone; determining that the flight control input navigates the drone out of an area authorized by the flight plan authorization; and autonomously navigating the drone to maintain operation in the area authorized by the flight plan authorization.

In Example 24, the subject matter of Examples 13-23 includes, obtaining an updated firmware when the firmware is determined to not be valid; and installing the updated firmware in the drone.

Example 25 is at least one machine-readable medium including instructions, which when executed by a machine, cause the machine to perform operations of any of the methods of Examples 13-24.

Example 26 is an apparatus comprising means for performing any of the methods of Examples 13-24.

Example 27 is an apparatus for operating a drone, the apparatus comprising: means for determining whether a firmware of the drone is valid; means for accessing a flight plan authorization when the firmware is determined to be valid; and means for navigating the drone according to the flight path authorization.

In Example 28, the subject matter of Example 27 includes, wherein the means for determining whether the firmware of the drone is valid comprise means for checking whether the firmware is of a latest version of the firmware.

In Example 29, the subject matter of Examples 27-28 includes, wherein the means for determining whether the firmware of the drone is valid comprise means for checking whether the firmware is a signed copy of the firmware.

In Example 30, the subject matter of Example 29 includes, wherein the firmware is signed by an airspace control agency.

In Example 31, the subject matter of Examples 27-30 includes, wherein the firmware includes an airspace database.

In Example 32, the subject matter of Examples 27-31 includes, wherein the flight plan authorization comprises a start time, an end time, a ceiling, a departure location, and an arrival location.

In Example 33, the subject matter of Examples 27-32 includes, wherein the flight plan authorization is provided by an airspace authority.

In Example 34, the subject matter of Example 33 includes, wherein the flight plan authorization is digitally signed by the airspace authority.

In Example 35, the subject matter of Examples 27-34 includes, wherein the means for navigating the drone according to the flight plan authorization comprise: means for checking whether the drone's operation is approaching the end time; and means for navigating the drone to an unrestricted area before the end time.

In Example 36, the subject matter of Example 35 includes, wherein the unrestricted area comprises the arrival location.

In Example 37, the subject matter of Examples 27-36 includes, wherein the means for navigating the drone according to the flight plan authorization comprise: means for receiving flight control input from a human operator of the drone; means for determining that the flight control input navigates the drone out of an area authorized by the flight plan authorization; and means for autonomously navigating the drone to maintain operation in the area authorized by the flight plan authorization.

In Example 38, the subject matter of Examples 27-37 includes, means for obtaining an updated firmware when the firmware is determined to not be valid; and means for installing the updated firmware in the drone.

Example 39 is at least one machine-readable medium including instructions for operating a drone, the instructions when executed by a machine, cause the machine to perform the operations comprising: determining whether a firmware of the drone is valid; accessing a flight plan authorization when the firmware is determined to be valid; and navigating the drone according to the flight path authorization.

In Example 40, the subject matter of Example 39 includes, wherein determining whether the firmware of the drone is valid comprises checking whether the firmware is of a latest version of the firmware.

In Example 41, the subject matter of Examples 39-40 includes, wherein determining whether the firmware of the drone is valid comprises checking whether the firmware is a signed copy of the firmware.

In Example 42, the subject matter of Example 41 includes, wherein the firmware is signed by an airspace control agency.

In Example 43, the subject matter of Examples 39-42 includes, wherein the firmware includes an airspace database.

In Example 44, the subject matter of Examples 39-43 includes, wherein the flight plan authorization comprises a start time, an end time, a ceiling, a departure location, and an arrival location.

In Example 45, the subject matter of Examples 39-44 includes, wherein the flight plan authorization is provided by an airspace authority.

In Example 46, the subject matter of Example 45 includes, wherein the flight plan authorization is digitally signed by the airspace authority.

In Example 47, the subject matter of Examples 39-46 includes, wherein navigating the drone according to the flight plan authorization comprises: checking whether the drone's operation is approaching the end time; and navigating the drone to an unrestricted area before the end time.

In Example 48, the subject matter of Example 47 includes, wherein the unrestricted area comprises the arrival location.

In Example 49, the subject matter of Examples 39-48 includes, wherein navigating the drone according to the flight plan authorization comprises: receiving flight control input from a human operator of the drone; determining that the flight control input navigates the drone out of an area authorized by the flight plan authorization: and autonomously navigating the drone to maintain operation in the area authorized by the flight plan authorization.

In Example 50, the subject matter of Examples 39-49 includes, obtaining an updated firmware when the firmware is determined to not be valid; and installing the updated firmware in the drone.

Example 51 is at least one machine-readable medium including instructions, which when executed by a machine, cause the machine to perform operations of any of the operations of Examples 1-50.

Example 52 is an apparatus comprising means for performing any of the operations of Examples 1-50.

Example 53 is a system to perform the operations of any of the Examples 1-50.

Example 54 is a method to perform the operations of any of the Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for operating a drone, the system comprising:
a trusted execution environment (TEE) circuit to:
store a firmware of the drone; and
determine whether the firmware is valid; and
a processor subsystem to:
access a flight plan authorization when the firmware is determined to be valid; and
navigate the drone according to the flight plan authorization.

2. The system of claim 1, wherein to determine whether the firmware of the drone is valid, the TEE circuit is to check whether the firmware is of a latest version of the firmware.

3. The system of claim 1, wherein to determine whether the firmware of the drone is valid, the TEE circuit is to check whether the firmware is a signed copy of the firmware.

4. The system of claim 3, wherein the firmware is signed by an airspace control agency.

5. The system of claim 1, wherein the firmware includes an airspace database.

6. The system of claim 1, wherein the flight plan authorization comprises a start time, an end time, a ceiling, a departure location, and an arrival location.

7. The system of claim 1, wherein the flight plan authorization is provided by an airspace authority.

8. The system of claim 7, wherein the flight plan authorization is digitally signed by the airspace authority.

9. The system of claim 1, wherein to navigate the drone according to the flight plan authorization, the processor subsystem is to:
check whether the drone's operation is approaching the end time; and
navigate the drone to an unrestricted area before the end time.

10. The system of claim 9, wherein the unrestricted area comprises the arrival location.

11. The system of claim 1, wherein to navigate the drone according to the flight plan authorization, the processor subsystem is to:
receive flight control input from a human operator of the drone;
determine that the flight control input navigates the drone out of an area authorized by the flight plan authorization; and
autonomously navigate the drone to maintain operation in the area authorized by the flight plan authorization.

12. The system of claim 1, wherein the TEE circuit is to:
obtain an updated firmware when the firmware is determined to not be valid; and
install the updated firmware in the drone.

13. A method of operating a drone, the method comprising:
determining whether a firmware of the drone is valid;
accessing a flight plan authorization when the firmware is determined to be valid; and
navigating the drone according to the flight plan authorization.

14. The method of claim 13, wherein determining whether the firmware of the drone is valid comprises checking whether the firmware is of a latest version of the firmware.

15. The method of claim 13, wherein determining whether the firmware of the drone is valid comprises checking whether the firmware is a signed copy of the firmware.

16. The method of claim 15, wherein the firmware is signed by an airspace control agency.

17. The method of claim 13, wherein the firmware includes an airspace database.

18. The method of claim 13, wherein the flight plan authorization comprises a start time, an end time, a ceiling, a departure location, and an arrival location.

19. The method of claim 13, wherein the flight plan authorization is provided by an airspace authority.

20. The method of claim 19, wherein the flight plan authorization is digitally signed by the airspace authority.

21. The method of claim 13, wherein navigating the drone according to the flight plan authorization comprises:
   checking whether the drone's operation is approaching the end time; and
   navigating the drone to an unrestricted area before the end time.

22. The method of claim 21, wherein the unrestricted area comprises the arrival location.

23. The method of claim 13, wherein navigating the drone according to the flight plan authorization comprises:
   receiving flight control input from a human operator of the drone;
   determining that the flight control input navigates the drone out of an area authorized by the flight plan authorization; and
   autonomously navigating the drone to maintain operation in the area authorized by the flight plan authorization.

24. At least one machine-readable medium including instructions for operating a drone, the instructions when executed by a machine, cause the machine to perform the operations comprising:
   determining whether a firmware of the drone is valid;
   accessing a flight plan authorization when the firmware is determined to be valid; and
   navigating the drone according to the flight plan authorization.

25. The machine-readable medium of claim 24, wherein determining whether the firmware of the drone is valid comprises checking whether the firmware is of a latest version of the firmware.

* * * * *